United States Patent
Van Wijngaarden

(10) Patent No.: US 10,589,883 B2
(45) Date of Patent: *Mar. 17, 2020

(54) SYSTEM AND METHOD FOR PACKAGING DOSED QUANTITIES OF SOLID DRUG PORTIONS

(75) Inventor: Arie Van Wijngaarden, Driebergen (NL)

(73) Assignee: BD SWITZERLAND SÀRL, Eysins (CH)

( * ) Notice: Subject to any disclaimer, the term of this patent is extended or adjusted under 35 U.S.C. 154(b) by 787 days.

This patent is subject to a terminal disclaimer.

(21) Appl. No.: 14/343,610

(22) PCT Filed: Aug. 31, 2012

(86) PCT No.: PCT/EP2012/067013
§ 371 (c)(1),
(2), (4) Date: May 22, 2014

(87) PCT Pub. No.: WO2013/034504
PCT Pub. Date: Mar. 14, 2013

(65) Prior Publication Data
US 2014/0298754 A1    Oct. 9, 2014

(30) Foreign Application Priority Data

Sep. 9, 2011    (NL) ..................................... 2007384

(51) Int. Cl.
*B65B 5/00*    (2006.01)
*B65B 5/10*    (2006.01)
(Continued)

(52) U.S. Cl.
CPC ................ *B65B 5/103* (2013.01); *B65B 9/06* (2013.01); *B65B 35/24* (2013.01); *B65B 57/18* (2013.01);
(Continued)

(58) Field of Classification Search
CPC ................................ B65G 47/18; B65B 5/103
(Continued)

(56) References Cited

U.S. PATENT DOCUMENTS 2,957,290 A * 10/1960 Andreessen .......... B65B 25/043
53/240
3,028,713 A *  4/1962 Kennedy ............... B65B 39/145
53/251
(Continued)

FOREIGN PATENT DOCUMENTS

| DE | 9001113 | 4/1990 |
| EP | 2062822 | 5/2009 |
| KR | 101029906 | 4/2011 |

OTHER PUBLICATIONS

Korean Office Action for Application No. 10-2014-7005411, dated Jan. 17, 2019, 13 pages.
(Continued)

*Primary Examiner* — Chelsea E Stinson
(74) *Attorney, Agent, or Firm* — Morgan, Lewis & Bockius LLP

(57) ABSTRACT

A system for packaging dosed quantities of solid drug portions comprises a plurality of dosing stations (2) for dispensing a dosed quantity of solid drug portions, a plurality of guiding ducts (7), a plurality of collecting containers (17) for receiving drug portions guided through the guiding ducts (7), and at least one discharge and packaging station (3) for transferring drug portions collected by each collecting container (17) to a packaging and for closing the packaging. The guiding ducts (7) are coupled to a transport means (6a, 6b, 8, 10, 11, 12, 15, 16) for moving the guiding ducts (7) along the dosing stations (2), wherein each guiding duct (7) is adapted to receive drug portions dispensed from at least one of the dosing stations (2) when the guiding duct (7) is positioned at the at least one dosing station (2), and to (Continued)

Figure 1:
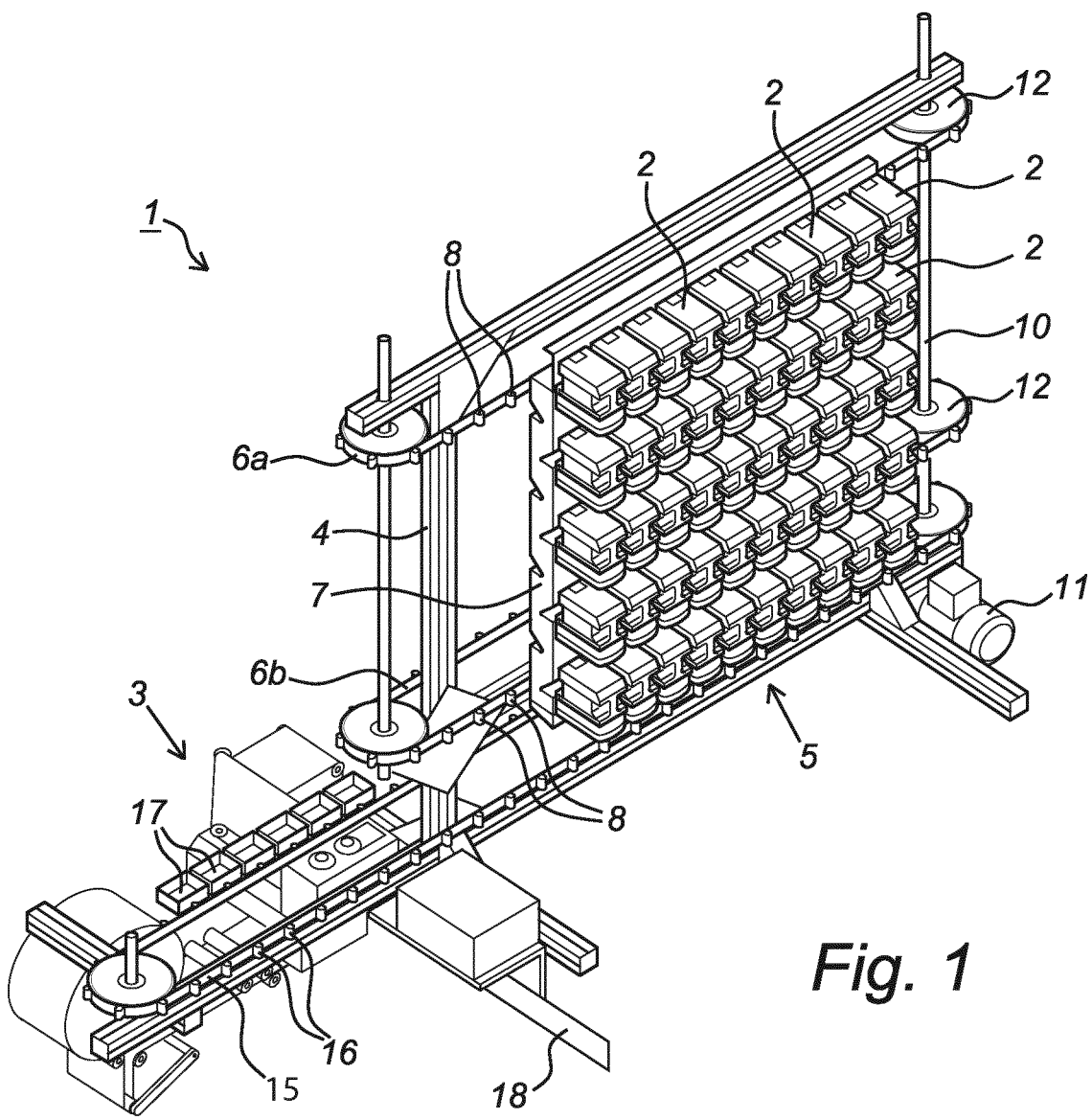

guide the received drug portions to an passage opening of the guiding duct (7). The collecting containers (17) are also coupled to the transport means (6a, 6b, 8, 10, 11, 12, 15, 16) so that each collecting container (17) can be positioned at the passage opening of one of the guiding ducts (7) to receive drug portions guided through the guiding duct (7).

27 Claims, 11 Drawing Sheets

(51) Int. Cl.
    B65G 47/18    (2006.01)
    B65B 9/06     (2012.01)
    G07F 17/00    (2006.01)
    B65B 35/24    (2006.01)
    B65B 57/18    (2006.01)

(52) U.S. Cl.
    CPC ......... B65G 47/18 (2013.01); G07F 17/0092 (2013.01); B65B 2220/14 (2013.01)

(58) Field of Classification Search
    USPC .... 53/443, 58, 498, 499, 237, 244, 247, 437
    See application file for complete search history.

(56) References Cited

U.S. PATENT DOCUMENTS

| | | | | |
|---|---|---|---|---|
| 4,552,262 A * | 11/1985 | Murakami | A22C 29/005 | 198/384 |
| 4,792,333 A | 12/1988 | Kidder | | |
| 5,709,063 A * | 1/1998 | Yuyama | B65B 1/06 | 53/154 |
| 6,208,908 B1 * | 3/2001 | Boyd | G06Q 10/087 | 198/349 |
| 6,497,083 B1 * | 12/2002 | Garwood | B65B 39/14 | 221/93 |
| 6,644,504 B2 * | 11/2003 | Yuyama | B65B 5/103 | 221/130 |
| 7,225,597 B1 * | 6/2007 | Knoth | B65B 5/103 | 53/244 |
| 7,284,578 B2 * | 10/2007 | Monti | B65B 35/12 | 141/131 |
| RE40,510 E * | 9/2008 | Lasher | B65B 61/20 | 53/131.4 |
| 7,591,124 B2 * | 9/2009 | Ruz | B65B 5/067 | 53/447 |
| 7,637,078 B2 * | 12/2009 | Ishiwatari | B65B 5/103 | 221/21 |
| 7,886,506 B2 * | 2/2011 | Knoth | G07F 11/44 | 221/1 |
| 7,894,656 B2 * | 2/2011 | Kim | G07F 11/00 | 382/141 |
| 7,950,206 B2 * | 5/2011 | Knoth | B65B 5/103 | 221/1 |
| 7,958,701 B2 * | 6/2011 | Knoth | B65B 5/103 | 221/121 |
| 8,234,838 B2 * | 8/2012 | Yasunaga | A61J 7/0084 | 221/123 |
| 8,239,214 B2 * | 8/2012 | Kim | G06F 11/1441 | 705/2 |
| 8,406,916 B2 * | 3/2013 | Bentele | B65B 5/103 | 104/28 |
| 9,796,496 B2 * | 10/2017 | Van De Koot | A61J 7/0084 | |
| 10,252,826 B2 * | 4/2019 | Lokkers | B65B 9/06 | |
| 2002/0162850 A1 * | 11/2002 | Yuyama | B65B 5/103 | 221/124 |
| 2004/0261357 A1 * | 12/2004 | Takahashi | B65B 5/103 | 53/247 |
| 2005/0217208 A1 * | 10/2005 | Cicognani | B65B 5/08 | 53/54 |
| 2006/0070352 A1 * | 4/2006 | Momich | B65B 39/001 | 53/437 |
| 2007/0084150 A1 * | 4/2007 | Siegel | B65B 5/103 | 53/475 |
| 2008/0190076 A1 * | 8/2008 | Klingel | B65B 5/103 | 53/493 |
| 2008/0222999 A1 * | 9/2008 | Monti | B65B 5/103 | 53/244 |
| 2008/0223001 A1 * | 9/2008 | Monti | B65B 5/105 | 53/246 |
| 2009/0056283 A1 * | 3/2009 | Monti | B65B 5/08 | 53/475 |
| 2009/0133362 A1 * | 5/2009 | Bentele | B65B 5/103 | 53/54 |
| 2010/0287880 A1 * | 11/2010 | Yasunaga | A61J 7/0084 | 53/64 |
| 2014/0298754 A1 * | 10/2014 | Van Wijngaarden | B65G 47/18 | 53/443 |
| 2015/0225101 A1 * | 8/2015 | Van Wijngaarden | B65B 57/20 | 53/443 |
| 2015/0251789 A1 * | 9/2015 | Lokkers | B65B 5/103 | 414/273 |
| 2015/0298839 A1 * | 10/2015 | Van De Koot | A61J 7/0084 | 198/347.1 |

OTHER PUBLICATIONS

Indian Office Action for Application No. 610/MUMNP/2014, dated May 2, 2019, 5 pages.
Korean Office Action for Application No. 1020197029408, dated Oct. 24, 2019, 16 pages.

* cited by examiner

SYSTEM AND METHOD FOR PACKAGING DOSED QUANTITIES OF SOLID DRUG PORTIONS

This application is the U.S. National Phase under 35 U.S.C. 371 of International Application No. PCT/EP/2012/067013, filed on Aug. 21, 2012, which claims the benefit of NL 2007384, filed Sep. 9, 2011. The entire contents of these applications are incorporated by reference herein.

The invention relates to a system for packaging dosed quantities of solid drug portions. The invention also relates to a method for dosing solid drug portions, in particular by making use of a system according to the invention.

It is usually advantageous to package dosed quantities of solid drug portions, such as tablets, capsules, caplets and pills, in bags, pouches or other types of packaging, wherein the drug portions in each bag are packed separately per ingestion, wherein the bag is provided with user information, such as the day and time of day the drug portions have to be taken. The bags for a user are generally attached to each other and supplied rolled up in a dispenser box.

The filling of individual packages with dosed quantities of solid drug portions (batches) is increasingly being automated. A known system for dosing solid drug portions for final packaging in individual packages comprises a plurality of supply containers respectively provided with different types of drugs. After reading or entering a medicine prescription the supply containers relevant to the prescription are opened in order to allow a dosed quantity of drug portions to drop into a central fall duct positioned under the supply containers. At the bottom of the fall duct the selectively released drug portions are collected and forwarded to and filled in a packaging, such as a bag or pouch, after which the packaging is closed. Providing the packaging with user information can be realized here prior to or following filling of the packaging. 60 packages per minute can be made up in this automated manner.

The known system does however have several drawbacks. A significant drawback of the known system is that the filling frequency or rate of the system depends to a considerable extent on, and is limited by, the (longest) drop time of the drug portions in the fall duct, whereby the filling frequency of the known system is limited and cannot be increased. In other word, a filling cycle for a next bag may only start after the filling cycle for a present bag can be expected to complete, i.e. after expiry of the maximum time expected for a drug portion to fall from the most distant (highest) supply container along the fall duct down to the bottom and the packaging. However, owing to the permanently increasing demand for drug portions, there is a need in practice to provide more packages of dosed quantity of drug portions per unit time.

It is an object of the invention to increase the filling frequency or rate.

This object is accomplished according to the present invention by a system for packaging dosed quantities of solid drug portions according to claim 1. Moreover, this object is accomplished by a method according to claim 24.

The system according to the invention for packaging dosed quantities of solid drug portions comprises: a plurality of dosing stations for dispensing a dosed quantity of solid drug portions, a plurality of guiding ducts coupled to a transport means for moving the guiding ducts along the dosing stations, wherein each guiding duct is adapted to receive drug portions dispensed from at least one of the dosing stations when the guiding duct is positioned at the at least one dosing station, and to guide the received drug portions to an passage opening of the guiding duct, a plurality of collecting containers coupled to the transport means so that each collecting container can be positioned at the passage opening of one of the guiding ducts to receive drug portions guided through the guiding duct, at least one discharge and packaging station for transferring drug portions collected by each collecting container to a packaging and for closing the packaging.

Applying mobile combinations of guiding means and collecting containers, which in fact function as temporary packages, enables multiple medicine prescriptions to be collected in parallel (simultaneously) instead of serially (successively), whereby the frequency for filling packages can be increased substantially. While the dosed quantity of solid drug portions is moved through a guiding duct, e.g. drops through a fall tube, the guiding duct (e.g. fall tube) and an underlying collecting container can be moved in continuous manner, generally in the direction of one or more following dosing stations (e.g. vertical columns of dosing stations) which—depending on the prescription to be followed—can optionally be activated for the purpose of dispensing a dosed quantity of drug portions. Preferably, each collecting container is adapted to collect one prescription generally associated with one user and a day and time the drug portions of this prescription will have to be taken. A prescription consists here of a predefined quantity and type of solid drug portions, e.g. formed by tablets, capsules or pills. A supply of different types of solid drug portions is held at different dosing stations. The distance between the outlet of each dosing station and the corresponding inlet of the guiding ducts (fall tubes) co-acting with each dosing station is preferably substantially constant, so that the time required for transferring drug portions from the dosing stations to the adjacent guiding ducts (fall tubes) is substantially the same, this making it possible to move the guiding ducts with the collecting containers at substantially constant speed.

In a preferred embodiment, the dosing stations are arranged in a plurality of parallel columns, each column comprising a plurality of dosing stations, wherein each guiding duct is adapted to receive drug portions dispensed from the dosing stations of a column when the guiding duct is positioned at the column of dosing station. Preferably, the dosing stations are arranged in a plurality of vertical columns and each guiding duct consists of a vertical fall tube. This simplifies the construction of the transport means and the frame carrying the dosing stations. The width of a fall tube in the transport direction preferably corresponds to the width of a dosing station. This allows for dosing stations having a maximum capacity with limited installation space.

The dosing stations generally take a stationary form. It is advantageous here for a plurality of dosing stations to be positioned adjacent to each other, this enabling simultaneous filling of a plurality of collecting containers. It is also advantageous for a plurality of dosing stations to be positioned above each other, whereby multiple types of medicine can be dispensed simultaneously to the same fall tube and subsequently to the same collecting container, this also enhancing the filling frequency of the system. It is particularly advantageous here for at least a number of the dosing stations to be arranged in a matrix structure with dosing stations arranged in multiple horizontal rows and multiple vertical columns. It is advantageous here for the dosing stations to be positioned as closely as possible to each other, which in addition to saving volume also results in time gains during filling of the collecting containers. It is further possible to envisage applying a plurality of matrix structures of dosing stations in order to further increase capacity. In a particular embodiment the system comprises two matrix structures, wherein each matrix structure comprises a plurality of dosing stations arranged in rows and columns, and wherein dispensing sides of the dosing stations of the two matrix structures face toward each other. Owing to such an orientation a number of fall tubes are enclosed by the two matrix structures.

In one embodiment, the collecting containers can be a part of the fall tubes (forming the guiding ducts) or each collecting container can be attached or mechanically coupled to a fall tube, so that the transport means moves the fall tubes together with the collecting containers. However, in a preferred embodiment the transport means comprises a first endless conveyor and a second endless conveyor, the fall tubes being coupled to the first endless conveyor and the collecting containers being coupled to the second endless conveyor. In this embodiment it is possible to move a collecting container away from the fall tube, if the fall tube has passed all dosing stations and all dispensed drug portions left the fall tube and reached the collecting container.

By causing movement of the fall tubes round the two matrix structures of dosing stations, and in this way along all dosing stations, the required drug portions can be collected in relatively efficient manner.

In one embodiment, the first endless conveyor comprises two parallel endless conveyor belts. In order to stabilize the movement of the fall tubes, it is usually advantageous for the system to comprise a plurality of endless conveyor belts, oriented substantially in parallel, wherein each fall tube is connected to a plurality of first conveyor belts. This stability, and particularly the stability in the vertical direction, can be further increased when the system comprises at least one stationary guide, such as a rail, for guiding the movement of the fall tubes.

In one embodiment, the system comprises drive means for driving the first endless conveyor and the second endless conveyor with the same transport speed. The drive means preferably comprise at least one electric motor. It is advantageous here for the drive means to be adapted for simultaneous driving both the first conveyor and the second conveyor. It is possible for this purpose to envisage the at least one first conveyor and the at least one second conveyor being coupled mechanically to each other. This coupling is preferably such that both conveyors are moved in the same direction and at the same speed. In this way, constant alignment between the fall tubes and the collecting containers can be guaranteed as far as possible. In one embodiment, the width of a collecting container in the transport direction substantially corresponds to the width of a guiding duct in the transport direction. A collecting container and a fall tube lying above are however preferably not physically connected to each other or even manufactured as one whole, since uncoupling of the two components enhances the flexibility of the system.

Physically separating the collecting containers from the fall tubes makes it possible to guide the collecting containers away from the fall tubes. In a preferred embodiment, the physical length of the second conveyor is greater than the length of the first conveyor so that the number of collecting containers coupled to the second conveyor is greater than the number of fall tubes coupled to the first conveyor. This makes it possible to guide the collecting containers along one or more other types of (special) dosing stations for direct dispensing of drug portions to the collecting containers, so not via the fall tubes. These special dosing stations can advantageously be used for instance when special drug portions, being drug portions which are dosed less frequently, are applied. In an advantageous embodiment each special dosing station comprises a supply drawer coupled to a carrier frame in such a way that the supply drawer can be displaced. It is possible here to envisage applying a plurality of such supply drawers coupled mechanically to each other. This makes it possible to position one supply drawer above the collecting containers for the purpose of dispensing drug portions, while another supply drawer is positioned a greater distance from the collecting containers to enable refilling thereof. It is advantageous for this purpose that each supply drawer is coupled detachably to the (same) carrier frame.

The first conveyor and second conveyor will generally have a substantially horizontal progression. It is advantageous for each fall tube to be coupled to the first conveyor in a suspended manner. This is because the first conveyor will generally be formed by a belt tensioned relatively tightly round two or more guide wheels, wherein each guide wheel rotates about a vertical shaft, whereby the bearing surface (width) of the belt extends in a substantially vertical direction and can function for the purpose of carrying the fall tubes in relatively stable manner. It is possible here to envisage, and usually advantageous, that each fall tube is coupled detachably to the first conveyor, this facilitating replacement and maintenance of the fall tubes. For the same reason it is advantageous for each collecting container to be coupled in suspended manner to the second conveyor. It is also advantageous here for each collecting container to be coupled detachably to the second conveyor in order to facilitate replacement and maintenance.

A collecting container will generally be deemed a drug portion carriage functioning for the purpose of collecting a prescription and transporting the collected drug portions to the discharge and packaging station. It is usually advantageous here for an upper side of each collecting container to take an open form and be adapted to receive a dosed quantity of drug portions falling out of a dosing station via a fall tube. The collecting container hereby also acquires the function of collecting tray. An underside of each collecting container preferably comprises a controllable closing element to enable removal of the collected drug portions. The closing element can be mechanically controllable in the discharge and packaging station. The closing element is however preferably controllable in contactless manner, more preferably by applying magnetism. At least a part of the closing element must however be given a magnetic or magnetisable form for this purpose. Operation of the closing element of such a type can for instance be realized by applying an electromagnet or permanent magnet in the discharge and packaging station. In an advantageous embodiment the collecting container comprises biasing means, such as for instance a compression spring, for urging the closing element in the direction of a closed state, whereby erroneous opening of the closing element can be prevented. The discharge station can in fact form part of the packaging station, wherein dispensing of drug portions collected in a collecting container to a packaging for closing can be followed almost immediately by closing of said packaging.

Since each collecting container collects its own prescription, it is desirable to know the location of the fall tubes and the collecting containers relative to the dosing stations. For this purpose, use can be made of a calibrating module for calibrating the position of at least one fall tube relative to the first conveyor and/or at least one collecting container relative to the second conveyor. The system can be calibrated by determining a reference or calibration point of at least one fall tube and/or collecting container, since the sequence and the transport speed of the fall tubes and the collecting containers are pre-known, as is the length of the first conveyor and the second conveyor. Recognition of a fall tube and/or collecting container by the calibrating module can for instance take place by providing the fall tube and/or collecting container with a unique label. It is however also possible to envisage not labelling the fall tubes and/or collecting containers, but to deem the fall tube and/or collecting container detected at a determined moment by the calibrating module as fall tube and/or collecting container serving as reference.

As already stated, at least a number of dosing stations are arranged adjacent to each other, this facilitating filling of a number of—also mutually adjacent—collecting containers. It is advantageous here for the width of a collecting container to substantially correspond to the width of a fall tube, and for the width of a fall tube to substantially correspond to the width of a dosing station, whereby the (mutually adjacent) dosing stations on the one hand and the (mutually adjacent) collecting containers on the other can be properly aligned relative to each other, this enhancing the reliability of the filling process. A typical width for dosing station, fall tube and collecting container is 80 mm.

The packaging station is preferably adapted to seal the packaging. Sealing is understood to mean substantially medium-tight closure of the packaging in order to enable the best possible preservation of the packaged drug portions. A (plastic) foil will generally be applied as packaging material and the seal will be formed by a welding process. A separate adhesive, in particular glue, can optionally be applied instead of a weld for the purpose of sealing the packaging. The packaging station is more preferably adapted to realize at least one longitudinal seal and at least one transverse seal, whereby bags are formed which are mutually connected and which in this way form a strip. Because the packaging station is preferably adapted to realize a transverse seal, the length of the bag to be formed can be determined and preferably made dependent on the number and/or the type of drug portions to be packaged in a bag. The packaging station will generally be placed a (horizontal) distance from the dosing stations, whereby heat generated by the packaging station will not be transferred, or hardly so, to the dosing stations and the drug portions held therein, this increasing the shelf-life of the drug portions. The packaging station is usually also provided with a printer for arranging a specific label on each formed packaging.

Each dosing station preferably comprises at least one supply container for drug portions, e.g. in tablet or capsule form, and a dosing device connecting to the at least one supply container. The dosing station as such is usually also referred to as a canister. The dosing device is adapted to separate one or more single drug portions from the drug portions present in the supply container. Dosing can take place by selectively removing the separated drug portions, generally by allowing them to fall, from the dosing device. In an advantageous embodiment the dosing device is displaceable relative to the supply container between a loading state, in which a receiving space of the dosing device connects to a delivery opening of the supply container, and an unloading state in which the dosing device covers the delivery opening and is adapted to deliver the separated drug portion to a collecting container coupled to the conveyor. The dosing device will generally be of substantially cylindrical form, wherein the one or more receiving spaces are arranged in the cylindrical dosing device, wherein each receiving space is generally adapted to temporarily hold one drug portion. Such a dosing device is usually also referred to as an individualizing wheel. By means of axial rotation of the cylindrical dosing element the dosing element can be displaced between a loading state, in which a receiving space of the dosing device is aligned with a delivery opening of the supply container, and an unloading state in which the dosing device covers the delivery opening and is adapted to deliver the separated drug portion to a fall tube coupled to the first conveyor. In a particular preferred embodiment, the dosing station comprises an electric motor, in particular a servo motor or stepper motor, for displacing the dosing device relative to the supply container. A stepper motor is particularly suitable for the present invention because the number of rotations made thereby, and therefore also the displacement of the dosing device, can be regulated very precisely. When, as described above, use is made of an electrical drive, a measuring element (sensor) can be applied to measure the resistance produced and/or the current consumed by the electric motor, whereby it is possible to detect whether a drug portion has become jammed between the supply container and the dosing device. The dosing device preferably comprises here at least one indicator, such as a lamp, for generating a signal when the degree of filling of the supply container falls below a predefined minimum value. For the purpose of controlling the electronics in the dosing station, the dosing station preferably comprises a station control for dispensing a dosed quantity of drug portions on demand. The station control can be particularly adapted here to reverse the electric motor if the resistance detected by the measuring element exceeds a predefined value. In the case a drug portion is jammed between the supply container and the dosing device the direction of displacement of the dosing device can thus be reversed, whereby the jam can be resolved. Each supply container will generally comprise an housing and a cover closing the housing. It is advantageous here for an outer side of the housing to be provided with at least one receiving space for a medicine in tablet form which is representative of the drug portions in tablet form received in the housing. The receiving space can be covered here, for instance by a transparent element, such that the pill or tablet received in the receiving space is directly visible from outside, whereby it is immediately apparent which type of medicine is being held by the supply container. Arranging of the receiving space in the housing is preferred to arranging of the receiving space in the cover, since the cover is generally not connected non-detachably to the housing and can thus be exchanged for another cover, which could result in an incorrect indication of the content of the supply container and, as a consequence, hazardous situations. The dosing device preferably comprises at least one sensor for detecting the moment at which a drug portion (e.g. medicine in tablet form) dispensed by the dosing station falls. Not only can the correct operation of the supply container, and in particular a dosing device received therein, be determined on the basis of detection of this falling moment, it is also possible to monitor that a supply container is no longer delivering drug portions and is therefore normally empty. If the sensor detects that insufficient medicine is being delivered to the fall tube, and subsequently to the collecting container, the entire content of the fall tube in the dispensing station will be discarded, after which—following filling of the empty dosing station and/or activation of another dosing station with the same type of medicine—the same prescription will once again be collected in a collecting container. It is possible in this way to prevent drug portions with different use-by dates being placed in the same packaging, this being undesirable from a health viewpoint.

The number of collecting containers is preferably greater than the number of columns of dosing stations. In a typical embodiment of the system according to the invention, the system comprises up to 3,000 columns of dosing stations and up to 4,500 collecting containers. In a preferred embodiment the system comprises 500 columns of dosing stations and 750 collecting containers. An advantageous ratio of the number of collecting containers to the number of columns of dosing stations is 3:2. Different dosing stations are provided here with different solid drug portions. It is however also possible to envisage a supply of frequently-used drug portions, such as paracetamol, being held in a plurality of dosing stations.

It is usually advantageous for the system to comprise at least one cleaning station for periodic cleaning of empty fall tubes and/or collecting containers. The cleaning station can connect here to the first conveyor and/or the second conveyor, whereby the fall tubes and/or the collecting containers need not be uncoupled. Cleaning of empty fall tubes and/or collecting containers can take place each time an empty fall tube and/or collecting container passes the cleaning station. The collecting containers will however generally be cleaned once every 8-36 hours in the cleaning station. Cleaning preferably takes place by applying acetone (propanone) in order to remove possible medicine residues. Blowing the medicine residues out of the collecting containers with air is also an option, but is usually less recommended because the blown about medicine residues can then find their way relatively easily into other collecting containers, and this is undesirable.

The system preferably comprises a control unit for controlling at least the discharge and packaging station, the dosing stations, the first conveyor and the second conveyors. It is advantageous here for the control unit to be adapted to determine, on the basis of a desired dosed quantity of drug portions for packaging, a dosed quantity of drug portions to be successively dispensed through time by a plurality of dosing stations via the fall tubes to the collecting containers. Because prescriptions are taken as starting point, a logistical conversion must be made to a—most efficient—method of filling the collecting containers, which conversion can be made using the control unit. The control unit can comprise a computer provided with a computer program, the computer program being adapted to determine a filling schedule for filling the collecting containers and subsequently the packages in the packaging station.

In addition, the method according to the invention for dosing solid drug portions, in particular by making use of a system according to the invention, comprises of: A) receiving a prescription with a desired quantity of solid drug portions, B) determining on the basis of the prescription the quantity of solid drug portions to be dispensed by at least one dosing station to a selected collecting container, C) moving the guiding ducts by the transport means and having the dosing stations dispense the determined quantity of drug portions to a guiding duct moving along the respective dosing stations for the purpose of guiding the dispensed solid drug portions to the selected collecting container, D) having the collecting container moved via the transport means to a discharge and packaging station, and E) having the dosed quantity of solid drug portions delivered by the collecting container into the discharge and packaging station. During step E) the dosed quantity of solid drug portions delivered by the collecting container is generally packaged here in a packaging optionally already provided with user information. Advantages and embodiment variants of the method according to the invention have already been discussed at length in the foregoing. During step A) a plurality of prescriptions are generally received, wherein during step B) each prescription is linked to a selected collecting container. A plurality of dosing stations are generally also applied, wherein during step C) a dosed quantity of drug portions is dispensed simultaneously by a plurality of dosing stations via at least one guiding duct (e.g. fall tube) to selected collecting containers. In an embodiment variant, determining the quantity of drug portions to be dispensed by at least one dosing station to a selected collecting container on the basis of the prescription during step B) takes place using a control unit. Use is generally also made here during step B) of a computer program comprising program instructions for performing the required calculation with a computer. The control unit and the computer can be at least partially integrated with each other here. The number of drug portions dispensed by each dosing station is preferably counted during step C). In this way it is possible to monitor whether a dosing station is empty, and it is also possible to calculate how many drug portions the dosing station still has in store. The drug portions collected by a collecting container during step E) are generally discarded if during step C) too few solid drug portions have been dispensed to the associated collecting container. It is not recommended to replenish this incomplete prescription with a similar type of the missing solid drug portion from another dosing station, so that the same type of solid drug portion has the same use-by date in the final packaging.

Preferred and/or advantageous embodiments of the invention are characterized in the dependent claims.

Figure 2:
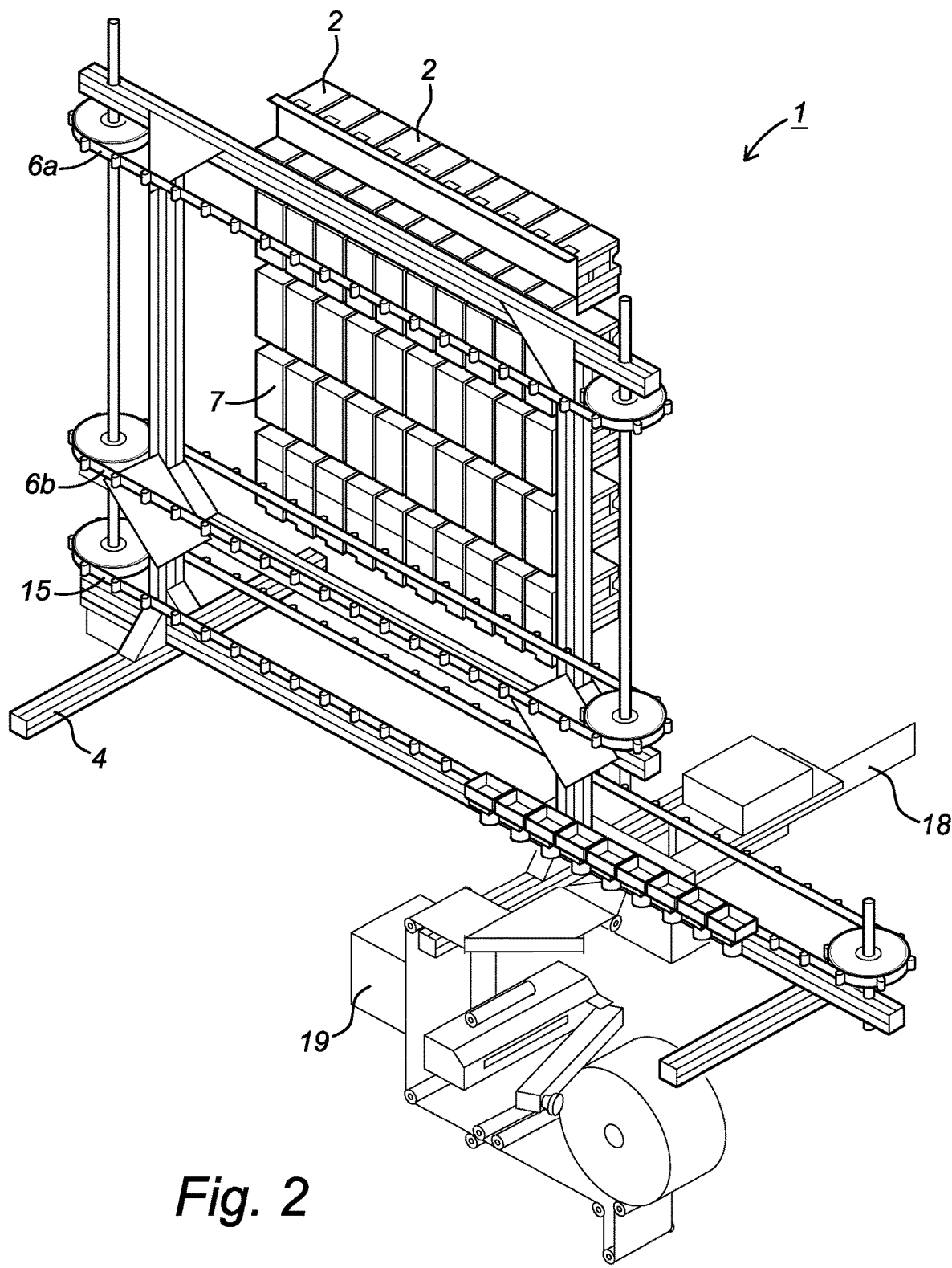
Figure 3:
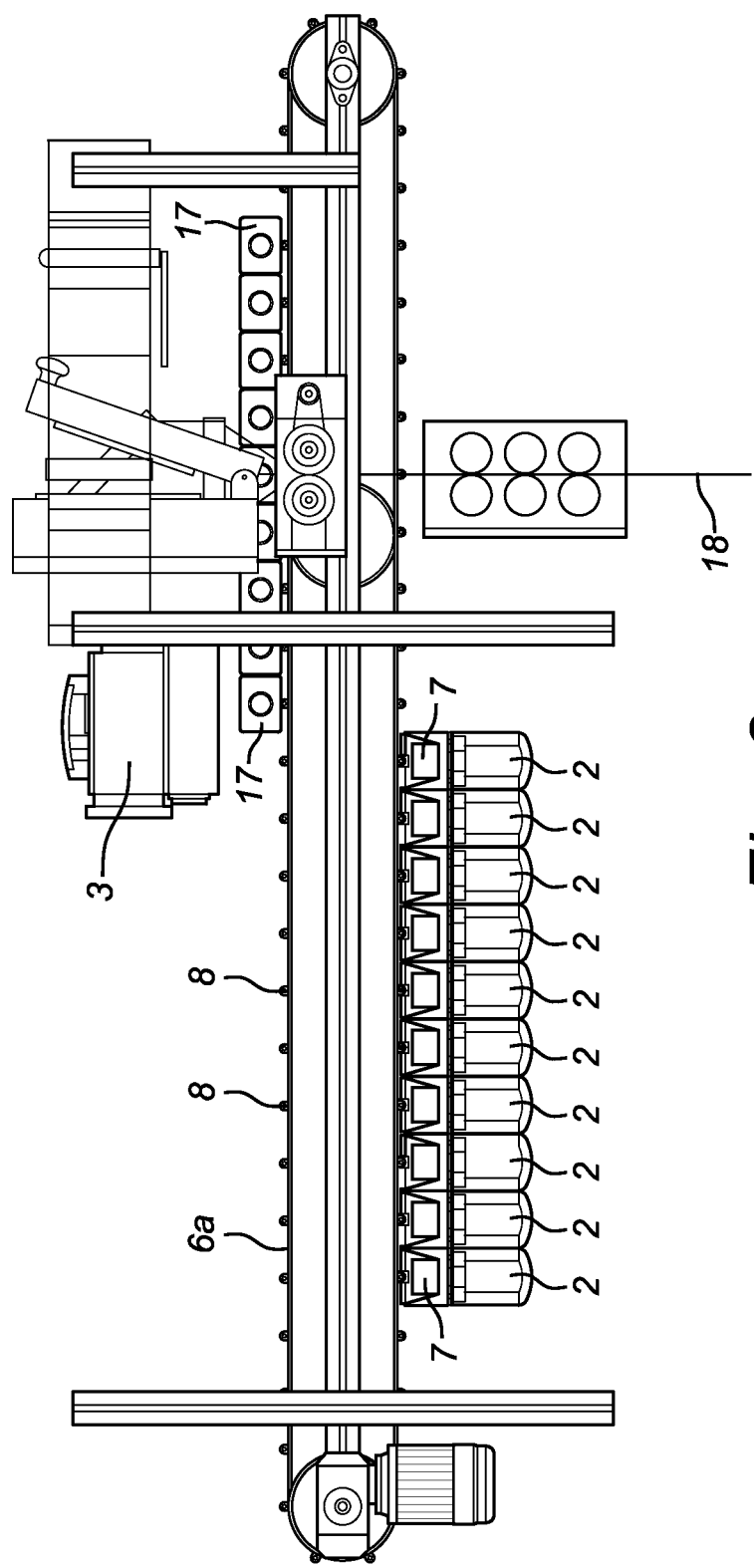
Figure 4:
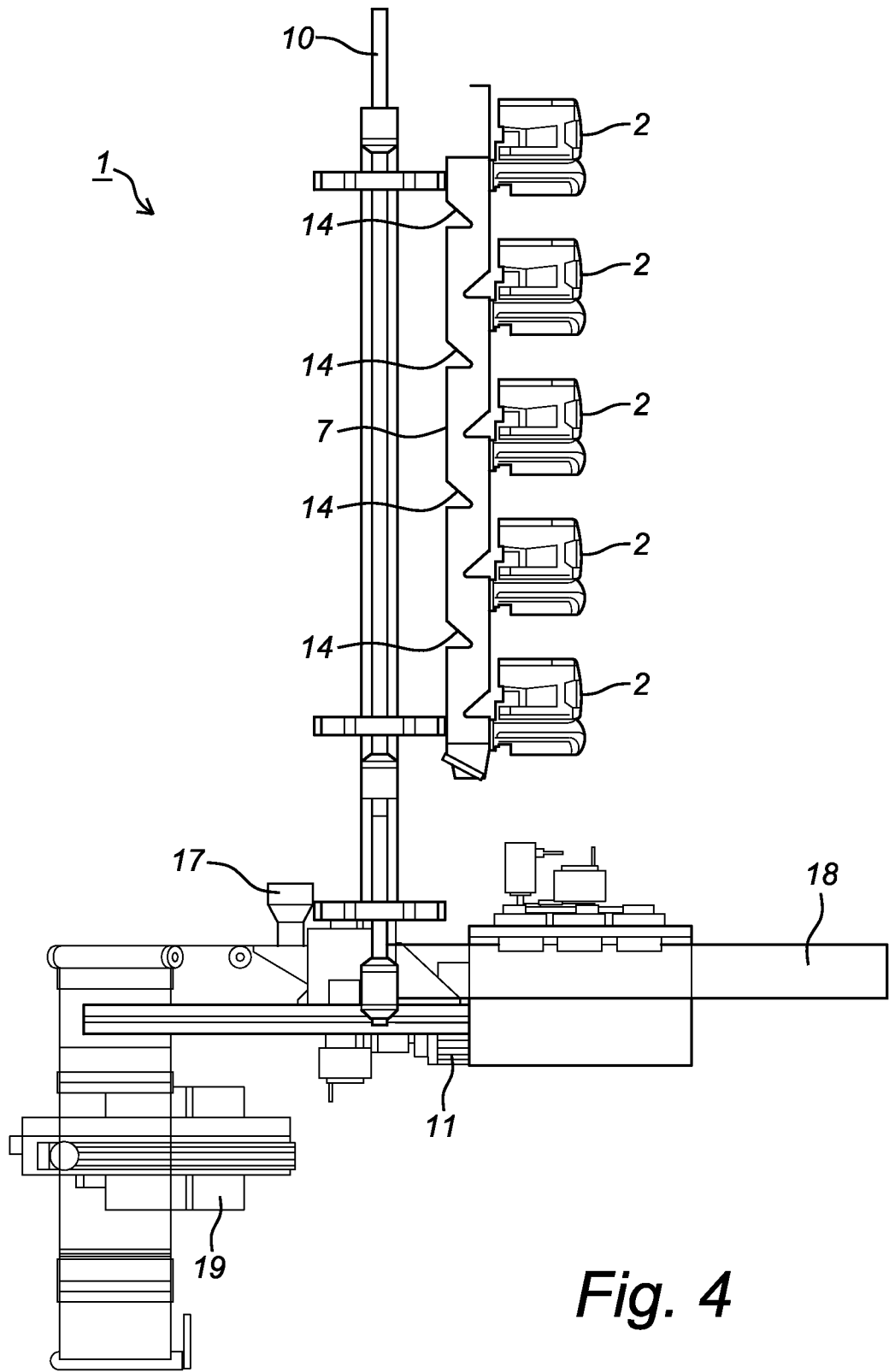
Figure 5:
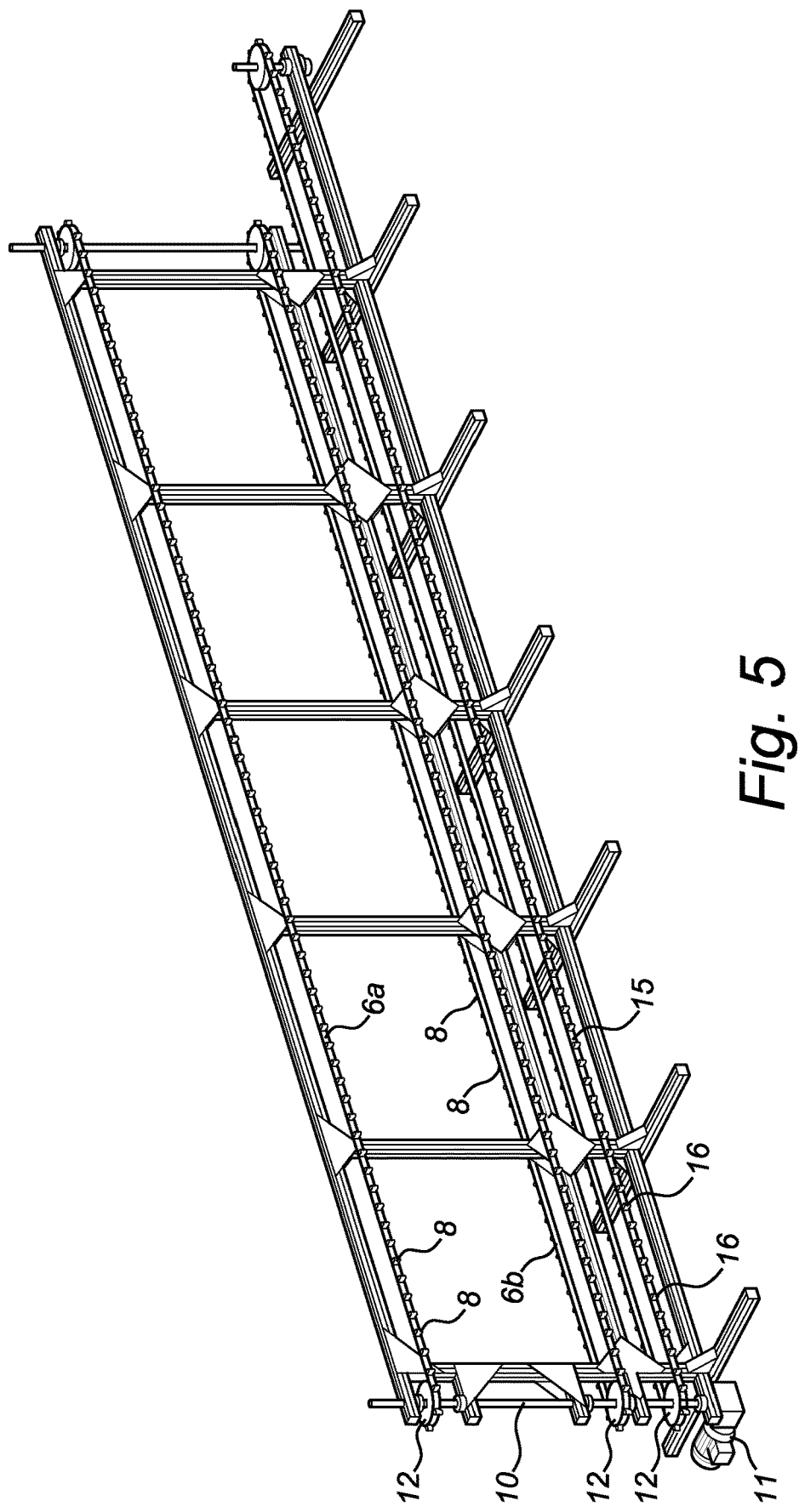
Figure 6:
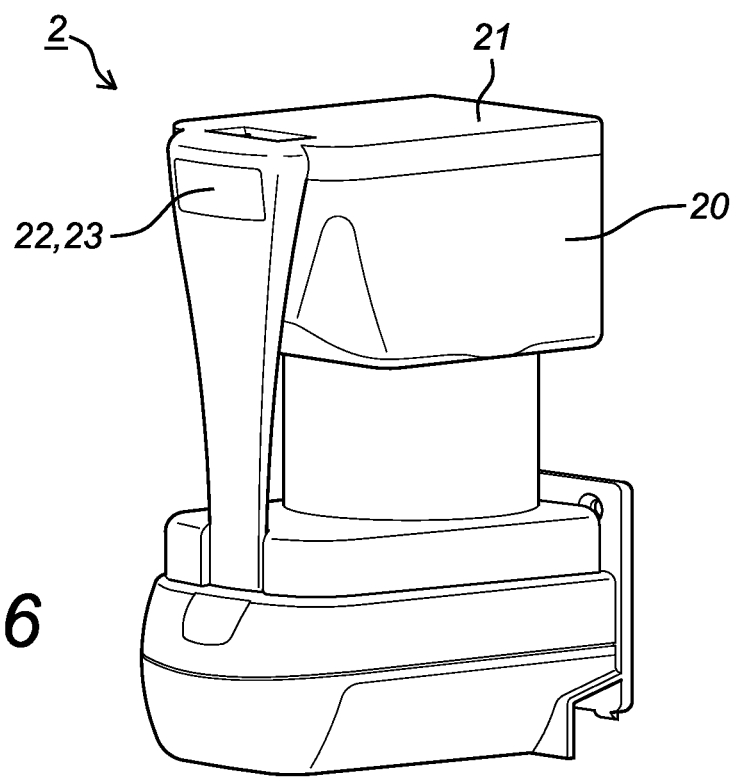
Figure 7:
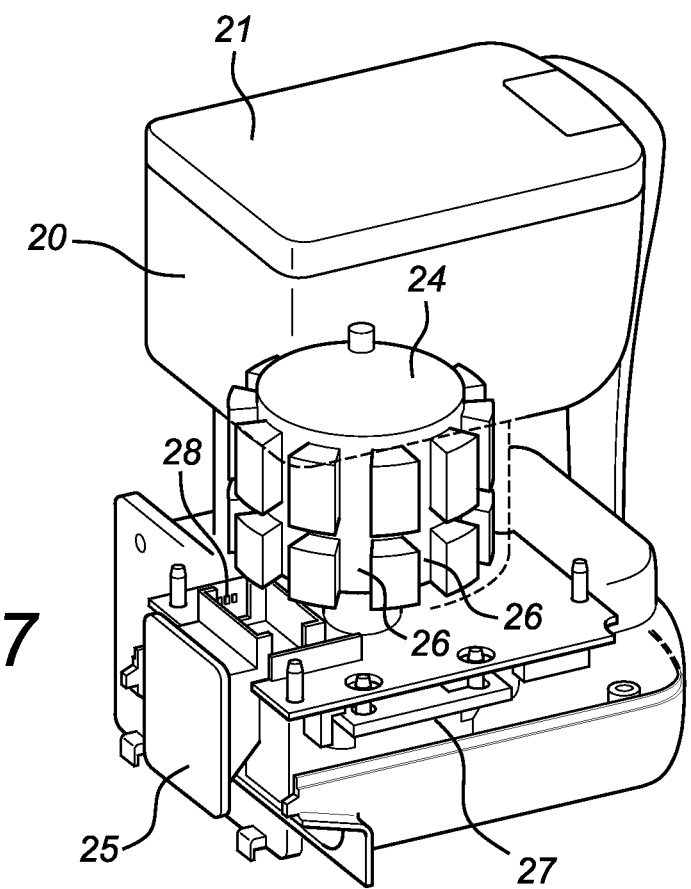
Figure 8:
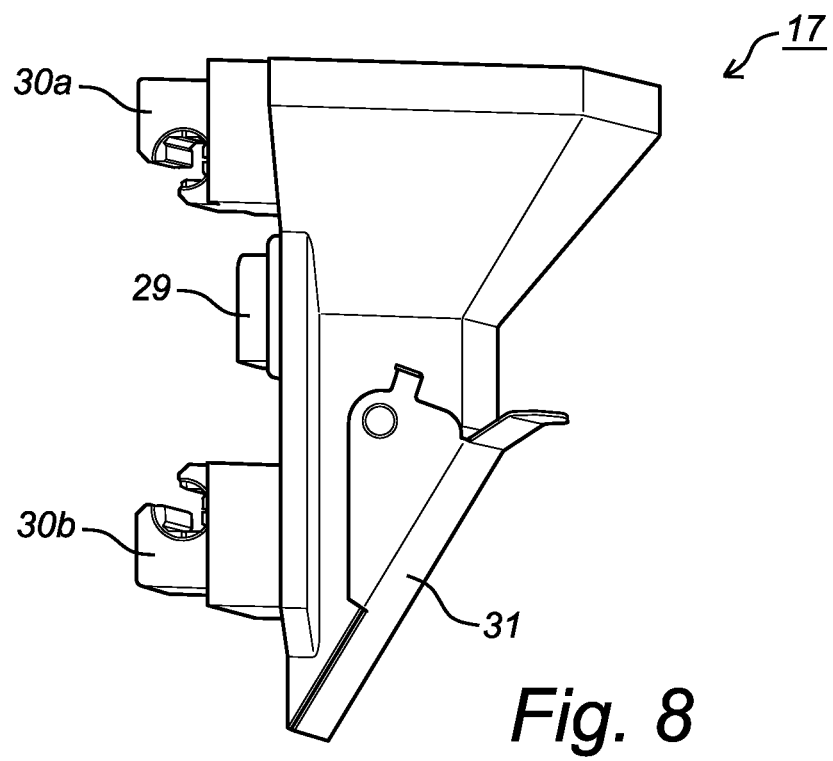
Figure 9:
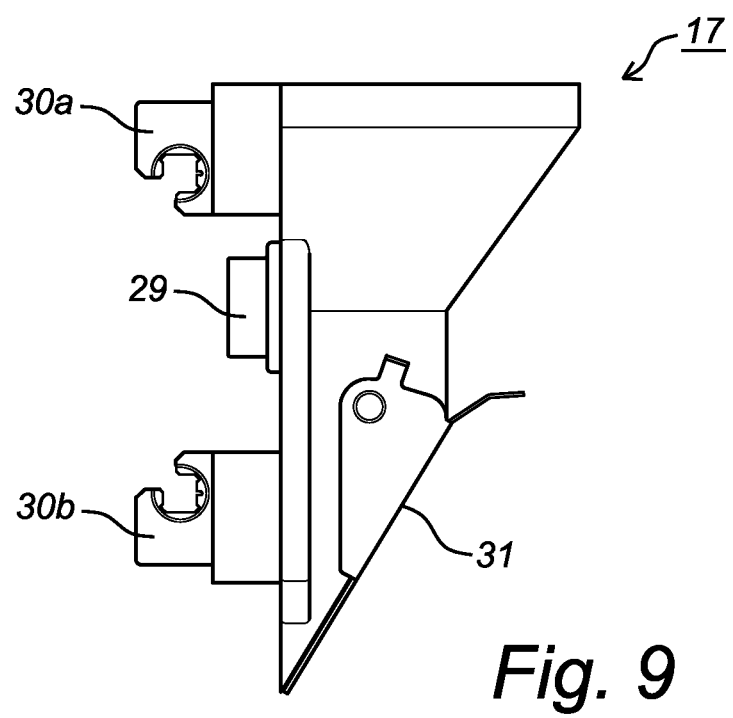
Figure 10:
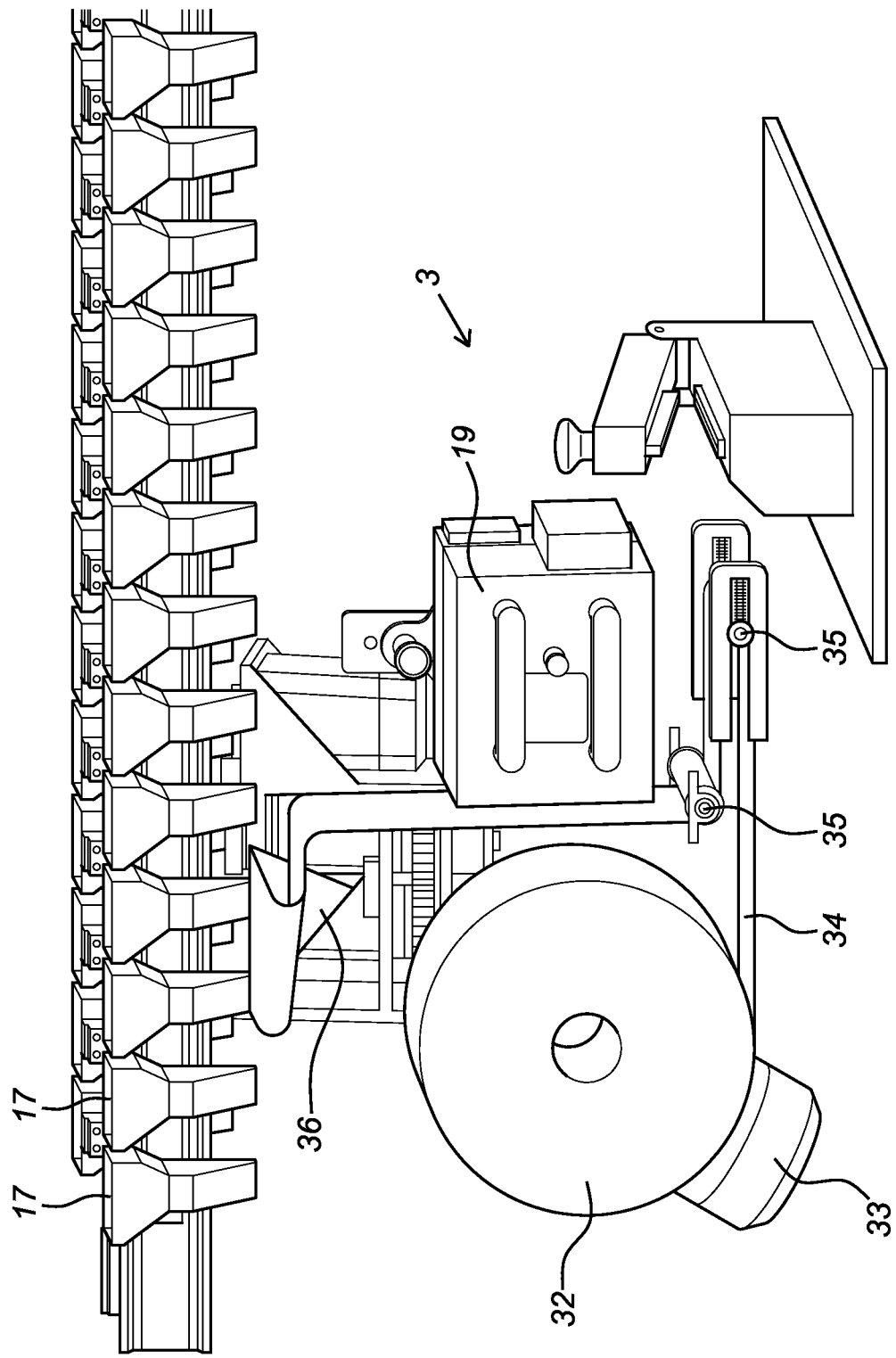
Figure 11:
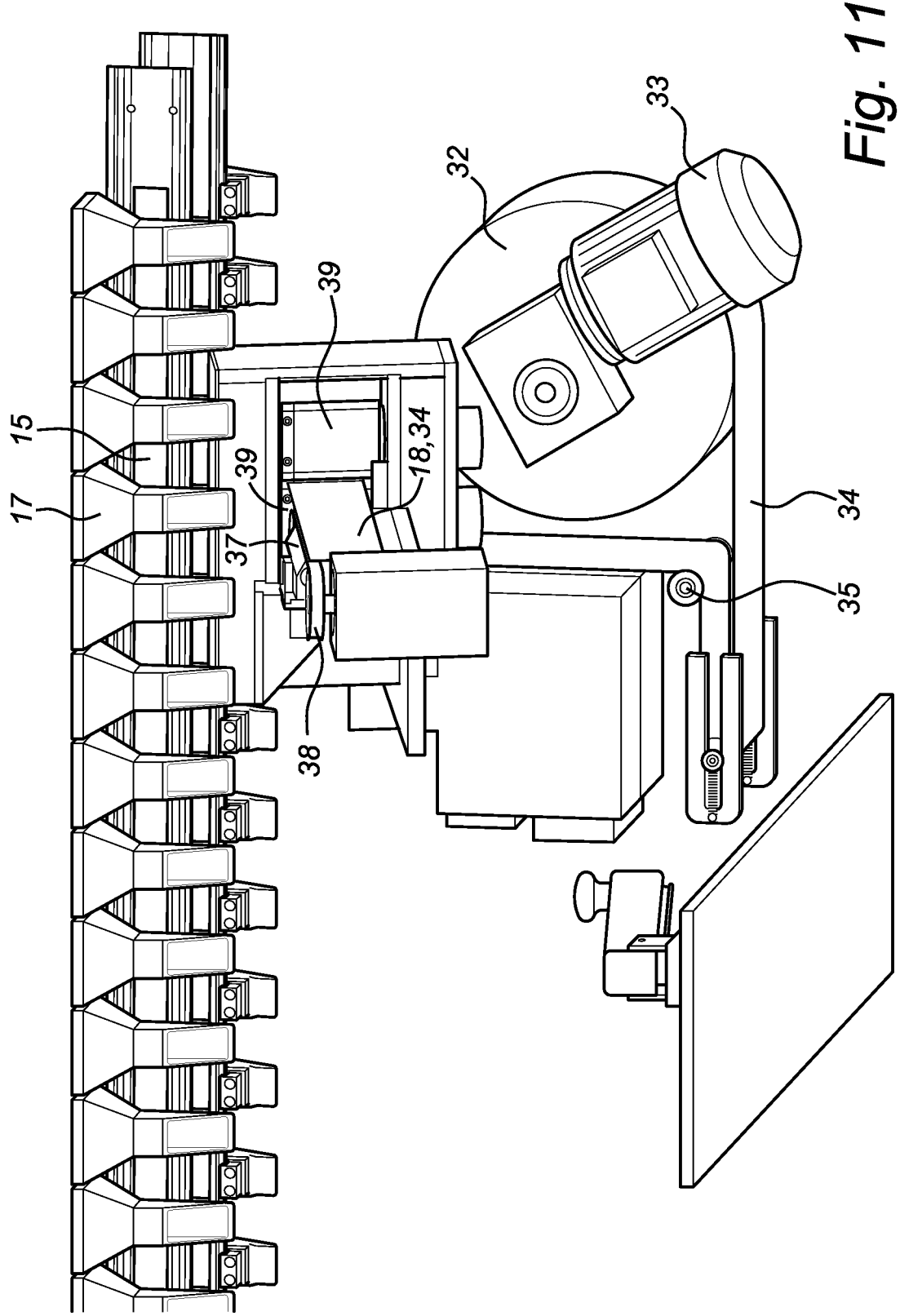
Figure 12:
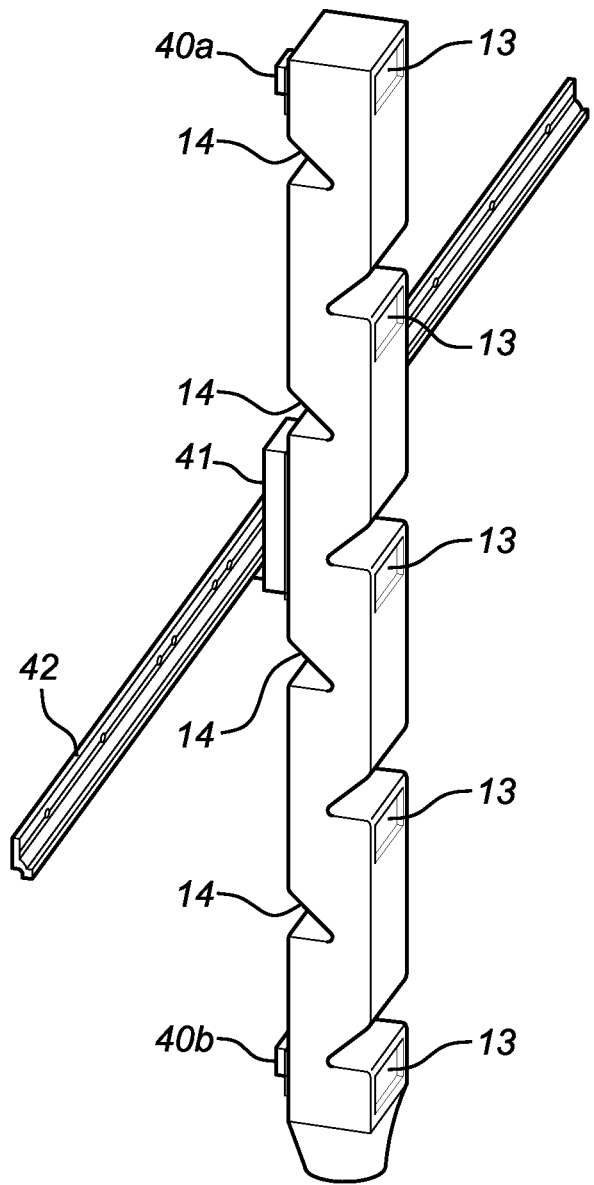

The invention will be elucidated on the basis of non-limitative exemplary embodiments shown in the following figures. Herein:

FIG. 1 is a first perspective view of a system according to the invention for transporting dosed quantities of solid drug portions from a plurality of dosing stations to a packaging station, FIG. 2 is a second perspective view of the system according to FIG. 1, FIG. 3 is a bottom view of the system according to FIG. 1, FIG. 4 is a side view of the system according to FIG. 1, FIG. 5 is a perspective view of the system 1 as shown in FIGS. 1-4, FIG. 6 is a perspective rear view of a dosing station for use in a system as shown in FIGS. 1-4, FIG. 7 is a perspective front view of the dosing station as shown in FIG. 6, FIG. 8 is a perspective view of a collecting container for use in a system 1 as shown in FIGS. 1-4, FIG. 9 is a side view of the collecting container according to FIG. 8, FIG. 10 is a perspective front view of the discharge and packaging station as applied in a system as shown in FIGS. 1-4, FIG. 11 is a perspective rear view of the discharge and packaging station according to FIG. 10, FIG. 12 shows a fall tube as applied in a system according to FIGS. 1-4, and FIG. 13 is a schematic example of the control of four dosing stations on the basis of four prescriptions received for four patients.

FIGS. 1 and 2 show different perspective views, FIG. 3 shows a bottom view and FIG. 4 shows a side view of a system 1 according to the invention for transporting dosed quantities of solid drug portions from a plurality of dosing stations 2 to a packaging station 3. System 1 comprises for this purpose a support structure 4 (frame) to which a plurality of dosing stations 2 are connected in stationary, detachable manner. Each dosing station 2 is adapted here to hold a supply of a type of drug (pharmaceutical). Different dosing stations 2 will generally hold a supply of different types of drugs, although it is also possible to envisage frequently-dosed drugs being held by a plurality of dosing stations 2. The majority of the number of applied dosing stations 2 are arranged in two matrix structures 5 (of which only a single matrix structure is shown in the figures), which matrix structures 5 together enclose a part of two first horizontally running conveyor belts 6a, 6b for guiding ducts in the form of fall tubes 7. Fall tubes 7 are mounted detachably here on mounting elements 8 forming part of both first conveyor belts 6a, 6b. In the shown exemplary embodiment only a few fall tubes 7 are shown, although in practice each mounting element 8 will generally be connected to a fall tube 7, whereby the first conveyor belts 6a, 6b are provided all the way round with fall tubes 7. The first conveyor belts 6a, 6b are driven by drive wheels 9 which are coupled by means of a vertical shaft 10 to an electric motor 11. In order to be able to counter slippage of conveyor belts 6a, 6b the running surfaces 12 of the drive wheels take a profiled form. Through driving of the first conveyor belts 6a, 6b the fall tubes 7 can be guided along the dosing stations 2 arranged in matrix structures 5 for the purpose of receiving dosed quantities of drug portions dispensed by dosing stations 2. Each fall tube 7 is adapted here for simultaneous co-action with a plurality of dosing stations 2 positioned above each other. Each fall tube 7 is provided for this purpose with a number of passage openings (or inlet openings) 13 corresponding to the number of dosing stations 2 in a vertical column, with which fall tube 7 will simultaneously co-act. Fall tube 7 is also provided with several break walls 14 for limiting the maximum length of the free fall of falling solid drug portions, in order to limit the falling speed, and thereby limit damage to the falling drug portions (see FIG. 12). Use is generally made here of a maximum free-fall length of 20 cm. System 1 also comprises a second conveyor belt 15 provided with mounting elements 16 on which a plurality of collecting containers 17, also referred to as drug carriages, are detachably mounted. Each mounting element 16 will generally be provided here with a collecting container 17 adapted for temporary storage of a dosed quantity of drug portions made up in accordance with a prescription. Not all collecting container 17 are shown in the figures. The second conveyor belt 15 is coupled mechanically to first conveyor belts 6a, 6b and is also driven by electric motor 11, wherein the direction of displacement and displacement speed of conveyor belts 6a, 6b, 15 are the same. It is moreover advantageous for the first conveyor belts 6a, 6b and the second conveyor belt 15 to be mutually aligned, wherein mounting elements 8, 16 lie in a substantially vertical line (directly under each other). The distance between adjacent mounting elements 8, 16 amounts to 80 mm, this substantially corresponding to the width of collecting containers 17, fall tubes 7 and dosing stations 2. Collecting containers 17 are adapted to receive drug portions falling through fall tubes 7. Each fall tube 7 is provided for this purpose on an underside with a passage opening for falling drug portions. For a part of the transport route, each collecting container 17 will be positioned here directly under a fall tube 7. In order to be able to prevent as far as possible sagging of conveyor belts 6a, 6b, 15 due to the weight of respectively fall tubes 7 and collecting containers 17, conveyor belts 6a, 6b are tensioned under a bias of about 600 N. Conveyor belts 6a, 6b, 15 are generally manufactured from a relatively strong plastic such as polyamide (nylon). As shown in the figures, the second conveyor belt 15 is longer than each of the first conveyor belts 6a, 6b. The advantage hereof is that collecting containers 17 can be transported further along and/or under one or more special dosing stations (not shown), preferably formed by drawers, provided with special—less frequently administered—drug portions, which special dosing stations 2 are adapted for direct delivery of selected drug portions to collecting containers 17, so not via fall tubes 7. Collecting containers 17 will then be guided in the direction of the discharge and packaging station 3 where the drug portions collected in accordance with prescription are discharged from collecting containers 17, wherein the drug portions are transferred to an opened foil packaging 18. In packaging station 3 the foil packaging 18 will be successively sealed and provided with specific (user) information. The overall control of system 1 is realized by applying a control unit 19.

FIG. 5 is a perspective view of support structure 4 provided with conveyor belts 6a, 6b, 15 of system 1 as shown in FIGS. 1-4, this in fact forming the heart of the system 1 on which fall tubes 7 and collecting containers 17 are mounted and around which dosing stations 2 are then positioned on both longitudinal sides of support structure 4.

FIG. 6 is a perspective rear view of a dosing station 2 for use in a system 1 as shown in FIGS. 1-4. Dosing station 2 is also referred to as a canister, formed by a unit which can be coupled detachably to support structure 4 and which comprises a housing 20 and a cover 21 closing the housing 20. The housing is preferably manufactured at least partially from a transparent material so that the degree of filling of dosing station 2 can be determined without opening dosing station 2. An outer side of housing 20 is provided with a receiving space 22 for a tablet or pill (drug portion) corresponding to tablets or pills held in the housing. Receiving space 22 is covered by means of a transparent cover element 23. A person can hereby see immediately with which tablets or pills the dosing station 2 has to be filled. In the perspective front view of dosing station 2 as shown in FIG. 7 the housing 20 is shown partially transparently in order to make visible the inner mechanism of dosing station 2. Accommodated as shown in housing 20 is an axially rotatable individualizing wheel 24 which is detachably connected to housing 20 and which is adapted during axial rotation to separate a single tablet or single pill which can subsequently be removed from housing 20 via a fall guide 25 arranged in the housing and can be transferred to a passage opening 13 of a fall tube 7 connecting onto fall guide 25. Individualizing wheel 24 is provided here with a plurality of receiving spaces 26 for pills or tablets distributed over the edge periphery. The size of receiving spaces 26 can generally be adapted to the size of the pills or tablets to be held in supply. Individualizing wheel 24 can be rotated axially by means of an electric motor 27 also accommodated in housing 20. Arranged in fall guide 25 is a sensor 28 which can detect the moment at which a pill or tablet for separation falls, and thereby also whether housing 20 has been emptied. Dosing stations 2 are visible from an outer side of system 1 and accessible for possible replenishment of dosing stations 2. Housing 20 will generally be provided with multiple LEDs (not shown) to enable indication of the current status of dosing station 2, and particularly in the case that dosing station 2 has to be replenished or is functioning incorrectly.

FIG. 8 is a perspective view and FIG. 9 is a side view of a collecting container 17 for use in system 1 as shown in FIGS. 1-4. Collecting container 17 comprises here a mating mounting element 29 for co-action with mounting element 16 of the second conveyor belt 15. In order to increase the stability of collecting container 17, the collecting container 17 also comprises two securing gutters 30a, 30b for clamping or at least engaging round the second conveyor belt 15. An upper side of collecting container 17 takes an opened form and has a funnel-like shape so that it can receive solid drug portions falling out of a fall tube 7. An underside of collecting container 17 is provided with a pivotable closing element 31 provided with an operating tongue via which the closing element 31 can be pivoted to enable opening, and thereby unloading, of collecting container 17. Collecting container 17 will generally be provided with a biasing element (not shown), such as a compression spring, in order to urge closing element 31 in the direction of the position closing the collecting container 17, whereby erroneous opening of collecting container 17 can be prevented.

FIGS. 10 and 11 respectively show a perspective front view and perspective rear view of the discharge and packaging station 3 as applied in system 1 as shown in FIGS. 1-4. Packaging station 3 comprises a foil roll 32 which can be unwound by means of an electric motor 33, after which the unwound foil 34 is guided via a plurality of guide rollers 35 in the direction of the collecting containers 17 to be emptied. The transport direction of foil 34 is indicated by means of arrows in both FIGS. 10 and 11. Before foil 34 is transported below a collecting container 17 for emptying, foil 34 is provided with a longitudinal fold, whereby a V-shaped fold 36 is created in which the drug portions can be received following opening of collecting container 17. Foil 34 can be provided with two transverse seals and a longitudinal seal to enable complete sealing of packaging 18. Applied in making the longitudinal seal are two heat bars 37, of which only one heat bar 37 is shown, and which press on either side of the two foil parts to be attached to each other, whereby the foil parts fuse together and the longitudinal seal is formed. It is advantageous here for each heat bar 37 to engage foil 34 via a stationary strip manufactured from plastic, in particular Teflon, or displaceable band 38 in order to prevent adhesion of heat bars 37 to the foil. The transverse seals are also created by two upright rotatable heat bars 39 which co-act with each other and press the foil parts against each other in realizing a transverse seal. Packaging 18 can optionally be further provided with a label. Successive packages 18 remain mutually connected in the first instance and together form a packaging strip.

FIG. 12 shows a fall tube 7 provided with two mating mounting elements 40a, 40b for co-action with mounting elements 8 of the two first conveyor belts 6a, 6b as applied in a system 1 according to any of the FIGS. 1-4. A particular feature however of the fall tube 7 shown in FIG. 12 is that fall tube 7 is provided with an additional central guide element 41 for co-action with a stationary guide 42 which can be attached to support structure 4 of system 1, whereby additional stability is imparted to fall tube 7 and both first conveyor belts 6a, 6b.

Figure 13:
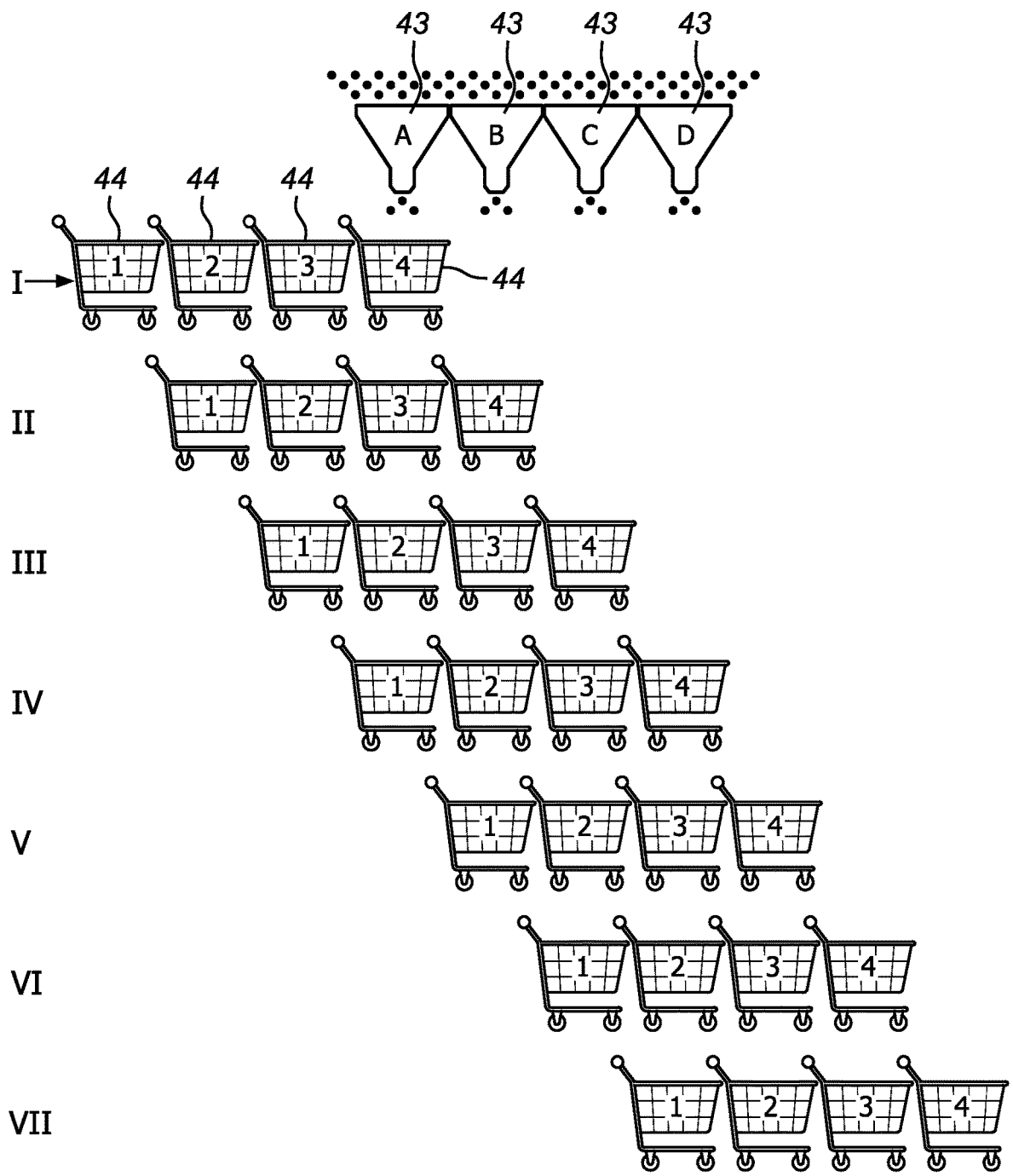

FIG. 13 shows a schematic and simplified example of the control of four dosing stations 43 (A, B, C, D) on the basis of four prescriptions received for four patients (1, 2, 3, 4). Applied for the sake of clarity in this simplified example are only four collecting containers 44, wherein each collecting container 44 is assigned to a specific patient and is thus used to collect a prescription for this patient. For the sake of convenience the fall tubes, which in fact couple dosing stations 43 to collecting containers 44, are omitted. Collecting containers 44 are coupled to a conveyor belt and in this way pass the different dosing stations 43. In this example the patients require the following quantities of medicine (A, B, C, D) (see table).

| Patient | Medicine | | | |
|---|---|---|---|---|
| | A | B | C | D |
| 1 | 0 | 1 | 1 | 2 |
| 2 | 2 | 2 | 0 | 1 |
| 3 | 0 | 1 | 0 | 1 |
| 4 | 1 | 2 | 3 | 4 |

It follows from the table that patient 1 for instance requires no tablets of medicine A, one tablet of medicine B, one tablet of medicine C and two tablets of medicine D. FIG. 13 shows seven different positions I-VII of the train of collecting containers 44. In position I the collecting container 44 of patient 4 is positioned under dosing station 43 filled with medicine A, whereby dosing station 43 will allow one tablet A to drop into collecting container 44 of patient 4. In position II collecting container 44 of patient 4 is positioned under dosing station 43 filled with medicine B, and collecting container 44 of patient 3 is positioned under the dosing station filled with medicine A. In this position II two tablets B will be deposited into collecting container 44 of patient 4; since patient 3 does not require a tablet A, the associated dosing station 43 will remain inactive. The following conversion can in this way be made to position-dependent dosages (see table).

| | A | B | C | D |
|---|---|---|---|---|
| I | 1 | 0 | 0 | 0 |
| II | 0 | 2 | 0 | 0 |
| III | 2 | 1 | 3 | 0 |
| IV | 0 | 2 | 0 | 4 |
| V | 0 | 1 | 0 | 1 |
| VI | 0 | 0 | 1 | 1 |
| VII | 0 | 0 | 0 | 2 |

The prescriptions of the different patients can be found here in a diagonal line (from top left to bottom right). Dosing stations 43 are activated on the basis of the above-stated analysis. Dosing station 43 can be activated at the correct moment on the basis of determining a reference position of a first collecting container 44, the transport speed of collecting containers 44 and the length of the conveyor belt.

It will be apparent that the invention is not limited to the exemplary embodiments shown and described here, but that numerous variants which will be self-evident to the skilled person in this field are possible within the scope of the appended claims.

The invention claimed is:

1. A system for packaging dosed quantities of solid drug portions, comprising:
   a plurality of dosing stations for dispensing a dosed quantity of solid drug portions;
   a plurality of guiding ducts coupled to a conveyor for moving the plurality of guiding ducts along the plurality of dosing stations, wherein each guiding duct is adapted to receive a drug portion dispensed from one of at least two vertically arranged dosing stations when a selected guiding duct from the plurality of guiding ducts is positioned in line with the at least two vertically arranged dosing stations, and to guide the drug portion to a passage opening of the selected guiding duct, wherein the selected guiding duct comprises at least two inlet openings aligned with the at least two vertically arranged dosing stations;
a plurality of collecting containers coupled to the conveyor so that at least one collecting container can be positioned at the passage opening of the selected guiding duct to receive the drug portion; and
at least one discharge and packaging station for transferring the drug portion collected by the at least one collecting container to a packaging and for closing the packaging.

2. The system as claimed in claim 1, wherein the plurality of dosing stations are stationary and arranged in a plurality of parallel columns in a vertical plane, each column comprising the at least two vertically arranged dosing stations, wherein each guiding duct consists of a vertical fall tube and is adapted to receive a plurality of drug portions dispensed from each of the at least two vertically arranged dosing stations.

3. The system as claimed in claim 2, wherein a width of a fall tube in a transport direction substantially corresponds to the width of a dosing station.

4. The system as claimed in claim 1, wherein the conveyor comprises a first endless conveyor and a second endless conveyor, the plurality of guiding ducts being coupled to the first endless conveyor and the plurality of collecting containers being coupled to the second endless conveyor.

5. The system as claimed in claim 4, wherein the first endless conveyor comprises two parallel endless conveyor belts.

6. The system as claimed in claim 4, wherein the system comprises drive means for driving the first endless conveyor and the second endless conveyor with a same transport speed.

7. The system as claimed in claim 6, wherein the first endless conveyor and the second endless conveyor are coupled mechanically to each other.

8. The system as claimed in claim 4, wherein a width of a collecting container in a transport direction substantially corresponds to a width of a guiding duct in a transport direction.

9. The system as claimed in claim 4, wherein a physical length of the second endless conveyor is greater than a length of the first endless conveyor so that the number of collecting containers coupled to the second endless conveyor is greater than a number of fall tubes coupled to the first endless conveyor.

10. The system as claimed in claim 4, wherein each fall tube is detachably coupled to the first endless conveyor.

11. The system as claimed in claim 4, wherein each collecting container is detachably coupled to the second endless conveyor.

12. The system as claimed in claim 4, further comprising at least one special dosing station for dispensing a less frequently applied drug portion, the special dosing station being positioned relative to the second endless conveyor such that drug portions delivered by the special dosing station can be received directly in a collecting container positioned at the special dosing station.

13. The system as claimed in claim 1, wherein an underside of a selected collecting container comprises a controllable closing element to enable removal of a collected drug portions from the collecting container.

14. The system as claimed in claim 13, wherein the controllable closing element is mechanically displaceable by the discharge and packaging station.

15. The system as claimed in claim 1, wherein each dosing station comprises a supply container receiving a plurality of solid drug portions and a dosing device connecting to the supply container, wherein the dosing device is adapted to separate a single solid drug portion from the plurality of solid drug portions present in the supply container.

16. The system as claimed in claim 15, wherein the dosing device is movable relative to the supply container between a loading state, in which a receiving space of the dosing device couples with a delivery opening of the supply container, and an unloading state in which the dosing device covers a delivery opening and is adapted to deliver the single solid drug portion to a guiding duct positioned at an outlet of the dosing station.

17. The system as claimed in claim 16, wherein the dosing station comprises an electric motor configured to move the dosing device relative to the supply container, and a measuring element for measuring a resistance produced by the electric motor.

18. The system as claimed in claim 17, wherein the dosing station comprises a station control for dispensing a dosed quantity of solid drug portions on demand, wherein the station control is adapted to reverse the electric motor when the resistance produced by the electric motor exceeds a predefined value.

19. The system as claimed in claim 16, wherein the dosing device comprises a rotating individualizing wheel mounted in the supply container.

20. The system as claimed in claim 15, wherein the dosing device comprises an indicator for generating a signal when a degree of filling of the supply container falls below a predefined minimum value.

21. The system as claimed in claim 15, wherein the dosing device comprises a sensor for detecting when a solid drug portion is dispensed by the dosing station.

22. The system as claimed in claim 1, wherein the system comprises a control unit for controlling the discharge and packaging station, the plurality of dosing stations, and the conveyor, wherein the control unit is adapted to determine, based on a desired dosed quantity of drug portions for packaging, a dosed quantity of drug portions to be successively dispensed through time by a plurality of dosing stations via the plurality of guiding ducts to the plurality of collecting containers.

23. The system as claimed in claim 1, further comprising:
a support structure having a stationary guide, wherein a mating mounting element of the selected guiding duct is coupled to a mounting element of the conveyor and a central guide element of the selected guiding duct is configured to engage with the stationary guide.

24. A method for dosing solid drug portions, comprising:
receiving a prescription with a desired quantity of solid drug portions;
determining based on the prescription, a quantity of solid drug portions to be dispensed by a first dosing station to a selected collecting container, the first dosing station arranged vertically with a second dosing station;
moving at least one guiding duct coupled to a first conveyor so that at least two inlet openings in the guiding duct are aligned with the first dosing station and the second dosing station;
having the first dosing station dispense the quantity of solid drug portions to the guiding duct moving along the first dosing station for guiding the quantity of solid drug portions to the selected collecting container;

moving the selected collecting container via a second conveyor to a discharge and packaging station; and delivering the prescription via the selected collecting container into the discharge and packaging station.

25. The method as claimed in claim 24, further comprising packaging the quantity of solid drug portions delivered by the collecting container into the discharge and packaging station.

26. The method as claimed in claim 24, wherein receiving a prescription with a desired quantity of solid drug portions comprises receiving a plurality of prescriptions, and further comprising linking each prescription to a selected collecting container.

27. The method as claimed in claim 24, further comprising discarding the quantity of solid drug portions collected by a collecting container when a sensor detects that insufficient medicine is being delivered to the collecting container.

* * * * *